US012398919B2

(12) United States Patent
Zhou

(10) Patent No.: US 12,398,919 B2
(45) Date of Patent: Aug. 26, 2025

(54) HEATER

(71) Applicant: Zhaofu Zhou, Shenzhen (CN)

(72) Inventor: Zhaofu Zhou, Shenzhen (CN)

( * ) Notice: Subject to any disclaimer, the term of this patent is extended or adjusted under 35 U.S.C. 154(b) by 0 days.

(21) Appl. No.: 19/027,705

(22) Filed: Jan. 17, 2025

(65) Prior Publication Data

US 2025/0164145 A1 May 22, 2025

(51) Int. Cl.
*F24H 1/06* (2022.01)
*F24H 15/132* (2022.01)
*H05B 1/02* (2006.01)

(52) U.S. Cl.
CPC ............. *F24H 1/06* (2013.01); *F24H 15/132* (2022.01); *H05B 1/0297* (2013.01)

(58) Field of Classification Search
CPC . F24H 1/10; F24H 1/101; F24H 1/102; F24H 1/103; F24H 1/105; F24H 1/16; F24H 1/162; F24H 1/18; F24H 1/12; F24H 1/20; F24H 1/201; F24H 1/202; F24H 1/203; F24H 15/00; F24H 15/128; F24H 15/132; H05B 1/0269; H05B 1/0283; H05B 1/0291; H05B 1/0297; H05B 3/40–52; H05B 3/78–82
USPC .................................................. 392/497–503
See application file for complete search history.

(56) References Cited

U.S. PATENT DOCUMENTS 4,068,116 A * 1/1978 McKinstry ............... H05B 3/80 392/455
5,109,473 A * 4/1992 Rezabek .................. H05B 3/80 338/273
5,465,014 A * 11/1995 Avvisati ................... H05B 3/80 219/523
5,834,741 A * 11/1998 Tseng ................... A01K 63/065 219/505
6,097,007 A * 8/2000 Wang ................... A01K 63/065 392/408
7,085,482 B2 * 8/2006 Renoud-Grappin ..... H05B 3/80 219/494
2021/0051925 A1 * 2/2021 Su ........................ A01K 63/065
2022/0151029 A1 5/2022 Takatsuka
2024/0098847 A1 3/2024 Kimura et al.
2024/0188192 A1 6/2024 Crawford et al.

OTHER PUBLICATIONS

Immersion heater on Amazon on-line website (Year: 2024).*

* cited by examiner

*Primary Examiner* — Sang Y Paik
(74) *Attorney, Agent, or Firm* — Hemisphere Law, PLLC; Zhigang Ma

(57) ABSTRACT

A heater is provided, including: a heater body and a driving controller; the heater body includes: a heating stick and a temperature probe; the driving controller includes a controller housing and a control circuit board; the control circuit board includes: an input protection module; a rectification and filtering module connected to the input protection module; a power conversion module connected to the rectification and filtering module; a 5V output module connected to the power conversion module; a main control module connected to the 5V output module; a touch function module, an on-off control module, a temperature detection module, a temperature display module, an indicator light module, and a buzzer module which are respectively connected to the main control module.

11 Claims, 12 Drawing Sheets

HEATER

TECHNICAL FIELD

The present disclosure belongs to the technical field of heaters, and in particular, to a heater.

BACKGROUND

Heaters in the prior art are generally configured to heat a water source such as a fish tank, a portable swimming pool, and a bathtub. The traditional heater can prevent dry burning through a temperature detector, which means that if the temperature detector detects that a temperature of water has not reached a preset value, the heater will continue to heat the water source, and will stop the heating until the temperature detector detects that the temperature of the water has reached the preset value. However, a control circuit board of the traditional heater can only achieve a logic determination function of the temperature detector to control a heating stick to be turned on and turned off, so that the function is relatively single and cannot satisfy increasing demands. Thus, designing a heater that can be accurately controlled and is safe enough is designed becomes a problem urgently needing to be solved by those skilled in the art.

SUMMARY

The present disclosure mainly aims to provide a heater. A driving controller is arranged in the heater; a control circuit board includes: an input protection module; a rectification and filtering module connected to the input protection module; a power conversion module connected to the rectification and filtering module; a 5V output module connected to the power conversion module; a main control module connected to the 5V output module; a touch function module, an on-off control module, a temperature detection module, a temperature display module, an indicator light module, and a buzzer module which are respectively connected to the main control module; and a heating control module connected to the on-off control module; the on-off control module is further respectively connected to a water shortage detection module and the temperature detection module; the heating stick is connected to the heating control module; and the temperature probe is connected to the temperature detection module. By using the above solution, first, since the input protection module is arranged in the control circuit board, when an overload is input, the heater can be powered off in time, thereby protecting the safety of a user. Second, since the touch function module, the temperature display module, the indicator light module, and the buzzer module are arranged in the control circuit board, a temperature of the heater can be precisely controlled through the above settings, and the user can be pre-warned in time that the heating has been completed. Thus, based on precise control, the user experience is enhanced.

To solve the above technical problems, the present disclosure adopts the following technical solutions:

A heater includes a heater body and a driving controller arranged on an external power cable of the heater body; the heater body includes: a heating stick and a temperature probe; the driving controller includes: a controller housing and a control circuit board arranged inside the controller housing;

the control circuit board includes: an input protection module; a rectification and filtering module connected to the input protection module; a power conversion module connected to the rectification and filtering module; a 5V output module connected to the power conversion module; a main control module connected to the 5V output module; a touch function module, an on-off control module, a temperature detection module, a temperature display module, an indicator light module, and a buzzer module which are respectively connected to the main control module; and a heating control module connected to the on-off control module; the on-off control module is further connected to the temperature detection module;

the heating stick is connected to the heating control module; and the temperature probe is connected to the temperature detection module.

In a preferred solution of the heater, the heater body further includes two water shortage probes, and the control circuit board module further includes a water shortage detection module; the on-off control module is further connected to the water shortage detection module; and two water shortage probes are connected to the water shortage detection module.

In a preferred solution of the heater, the input protection module is a fuse, and the rectification and filtering module includes a rectifier bridge DB1; one end of the input protection module is connected to a live wire, and the other end of the input protection module is connected to a first pin of the rectifier bridge BD1; and a third pin of the rectifier bridge BD1 is connected to a neutral wire.

In a preferred solution of the heater, the rectification and filtering module further includes: a capacitor EC1, a capacitor EC2, and an inductor L1; one end of the capacitor EC1 is respectively connected to a second pin of the rectifier bridge BD1 and one end of the inductor L1; the other end of the capacitor EC1 is respectively connected to a fourth pin of the rectifier bridge BD1 and the capacitor EC2; and the other end of the inductor L1 is connected to the other end of the capacitor EC2.

In a preferred solution of the heater, the power conversion module includes: a capacitor C1, a capacitor C2, a capacitor CE4, a resistor R1, a resistor R2, a resistor R4, a resistor R5, a resistor R6, a resistor R7, a diode D1, a diode D3, a chip U1, and a transformer T1; the 5V output module comprises: a capacitor CE3, a resistor R3, and a diode D2; the other end of the inductor L1 and the other end of the capacitor EC2 are respectively connected to one end of the resistor R1, one end of the resistor R2, one end of the capacitor C1, and a sixth pin of the transformer T1; the other end of the resistor R1 is respectively connected to one end of the diode D3, one end of the capacitor CE4, and a third pin of the chip U1; the other end of the capacitor CE4 is grounded; the other end of the resistor R2 and the other end of the capacitor C1 are respectively connected to one end of the diode D1; the other end of the diode D1 is respectively connected to a seventh pin of the chip U1, an eighth pin of the chip U1, and a fifth pin of the transformer T1; the other end of the diode D3 is connected to one end of the resistor R7; the other end of the resistor R7 is connected to one end of the resistor R4 and a fourth pin of the transformer T1; the other end of the resistor R4 is connected to one end of the resistor R5, one end of the capacitor C2, and a second pin of the chip U1; the other end of resistor R5 is connected to the ground and the other end of the capacitor C2; a first pin of the chip U1 is connected to one end of the resistor R6; the other end of the resistor R6 is connected to the ground; a fifth pin and sixth pin of the chip U1 are connected to the ground; a third pin of the transformer T1 is connected to the ground; one end of the diode D2 is connected to a first pin of the transformer T1; the other end of the diode D2 is respectively connected to one end of the capacitor CE3 and one end of the resistor R3; and the other end of the capacitor CE3 and the other end of the resistor R3 are connected to a second pin of the transformer T1 and the ground.

In a preferred solution of the heater, the main control module is a chip U2; the water shortage detection module comprises: a relay J4, a resistor R8, a resistor R24, a resistor R29, a capacitor C3, a capacitor C4, a capacitor C5, a capacitor C7, and a terminal TZ; a first pin of the relay J4 is respectively connected to one end of the resistor R29, one end of the resistor R8, one end of the capacitor C4, and a first pin of the chip U2; the other end of the resistor R8 is respectively connected to one end of the resistor R3 and one end of the capacitor C3; the other end of the capacitor C3 is connected to the ground; the other end of the resistor R29 is respectively connected to a twelfth pin of the chip U2, one end of the resistor R24, and one end of the capacitor C7; the other end of the capacitor C7 is connected to the ground; the other end of the resistor R24 is connected to a first pin of the terminal TZ; a second pin of the terminal TZ is connected to the ground; the other end of the capacitor C4 and one end of the capacitor C5 are connected to the third pin of the chip U2 and the ground; the other end of the capacitor C5 is connected to a second pin of the chip U2; a second pin of the relay J4 is connected to the ground; a third pin of the relay J4 is connected to a seventh pin of the chip U2; a fourth pin of the relay J4 is connected to an eighth pin of the chip U2; the two water shortage probes are electrically connected to the terminal TZ; the on-off control module includes: a triode Q1, a resistor R9, and a diode D4; a first pin of the triode Q1 is connected to one end of the resistor R9; the other end of the resistor R9 is connected to a twenty-sixth pin of the chip U2; a second pin of the triode Q1 is connected to ground; a third pin of the triode Q1 is connected to one end of the diode D4; the other end of the diode D4 is connected to one end of the resistor R3; the heating control module includes: a relay J3 and a terminal HERT2; a first pin of the relay J3 is connected to one end of the resistor R3; a second pin of the relay J3 is connected to one end of the diode D4 and a third pin of the triode Q1; a third pin of the relay J3 is connected to a neutral wire; a fourth pin of the relay J3 is connected to the terminal HERT2; the heating stick is connected to the terminal HERT2; the temperature detection module comprises: a resistor R25, a capacitor C6, and a terminal NTC1; one end of the resistor R25 is connected to one end of the resistor R3, and the other end of the resistor R25 is respectively connected to an eleventh pin of the chip U2, one end of the capacitor C6, and a first pin of the terminal NTC1; the other end of the capacitor C6 is connected to the ground; a second pin of the terminal NTC1 is connected to the ground; and the temperature probe is connected to the terminal NTC1.

In a preferred solution of the heater, the temperature display module includes: a digital light-emitting diode (LED) 1 tube, a resistor R10, a resistor R11, a resistor R14, resistor R15, a resistor R16, a resistor R17, a resistor R18, and a resistor R19; the driving controller further comprises a display screen; the display screen is embedded in a position, located at the digital LED1 tube, on the controller housing; a first pin of the digital LED1 tube is connected to one end of the R16; the other end of the R16 is connected to a sixteenth pin of the chip U2; a second pin of the digital LED1 tube is connected to one end of the R15; the other end of the R15 is connected to a twenty-second pin of the chip U2; a third pin of the digital LED1 tube is connected to one end of the R19; the other end of the R19 is connected to a twenty-third pin of the chip U2; a fourth pin of the digital LED1 tube is connected to one end of the R14; the other end of the R14 is connected to a twenty-fourth pin of the chip U2; a fifth pin of the digital LED1 tube is connected to one end of the R18; the other end of the R18 is connected to a twenty-fifth pin of the chip U2; a sixth pin of the digital LED1 tube is a normally closed contact; a seventh pin of the digital LED1 tube is connected to one end of the R11; the other end of the R11 is connected to a twentieth pin of the chip U2; an eighth pin of the digital LED1 tube is connected to a nineteenth pin of the chip U2; a ninth pin of the digital LED1 tube is connected to an eighteenth pin of the chip U2; a tenth pin of the digital LED1 tube is connected to one end of the R17; the other end of the R17 is connected to a seventeenth pin of the chip U2; an eleventh pin of the digital LED1 tube is connected to one end of the R10; the other end of the R10 is connected to a sixteenth pin of the chip U2; a twelfth pin of the digital LED1 tube is connected to a fifteenth pin of the chip U2; the indicator light module includes: a red LED2, a green LED2, a resistor R12, a resistor R13, a red LED3, a green LED3, a resistor R27, and a resistor R28; one end of the red LED2 and one end of the green LED2 are connected to one end of the resistor R3; the other end of the red LED2 is connected to one end of the resistor R12; the other end of the resistor R12 is connected to a fifth pin of the chip U2; the other end of the green LED2 is connected to one end of the resistor R13; the other end of the resistor R13 is connected to a fourth pin of the chip U2; one end of the red LED3 and one end of the green LED3 are connected to one end of the resistor R3; the other end of the red LED 3 is connected to one end of the resistor R27; the other end of the resistor R27 is connected to a thirteenth pin of the chip U2; the other end of the green LED3 is connected to one end of the resistor R28; and the other end of the resistor R28 is connected to a fourteenth pin of the chip U2.

The buzzer module includes: a triode Q2, a resistor R20, a resistor R26, and a terminal Speak1; the driving controller further comprises a buzzer body; one end of the resistor R20 is connected to a twenty-seventh pin of the chip U2; the other end of the resistor R20 is connected to a first pin of the triode Q2; a second pin of the triode Q2 is connected to the ground; a third pin of the triode Q2 is connected to a first pin of the terminal Speak1; a second pin of the terminal Speak1 is connected to one end of the resistor R26; the other end of the resistor R26 is connected to one end of the resistor R3; and the buzzer body is electrically connected to the terminal Speak1.

In a preferred solution of the heater, the touch function module includes: a button K1, a button K2, a button K3, a resistor R21, a resistor R22, and a resistor R23; the driving controller further comprises touch springs; the controller housing is provided with touch areas at positions corresponding to the button K1, the button K2, and the button K3; the touch springs are sandwiched between the buttons K1, K2, K3, and the corresponding touch areas; one end of the button K1 is connected to the resistor R23; the other end of the resistor R23 is connected to a twenty-eighth of the chip U2; one end of the button K2 is connected to the resistor R22; the other end of the resistor R22 is connected to a tenth pin of the chip U2; one end of the button K3 is connected to the resistor R21; and the other end of the resistor R21 is connected to a ninth pin of the chip U2.

In a preferred solution of the heater, the heater body further includes a mounting base and a heater housing; the heating stick is mounted on one side of the mounting base; the heater housing is mounted on one side of the mounting base and is covered at the heating stick; the two water shortage probes are mounted at a position, located inside the heater housing, on one side of the mounting base; the temperature probe is mounted at a position, located outside the heater housing, on one side of the mounting base; and a plurality of hollow holes are provided in the heater housing.

In a preferred solution of the heater, the mounting base includes: a mounting base housing and a mounting base rear cover; an accommodating slot is provided in the other side of the mounting base housing; the heating stick, the two, and the temperature probe extend into the accommodating slot for being fixed after passing through one side of the mounting base rear cover; the mounting base rear cover is fixed at an opening of the accommodating slot; and a power cable connected to the driving controller is respectively electrically connected to the heating stick, the two water shortage probes, and the temperature probe through the mounting base rear cover.

In a preferred solution of the heater, the heater housing includes a housing body and a housing plug; one side of the mounting base housing extends towards the housing body to form a first fixed flange; after the housing body sleeves the first fixed flange, a fixing screw extends into the first fixed flange for fixing through the housing body; one side of the housing plug extends towards the housing body to form a second fixed flange; and after the housing body sleeves the second fixed flange, a fixing screw extends into the second fixed flange for fixing through the housing body.

Beneficial effects of the present disclosure are as follows:

The present disclosure provides a heater. The heater includes: a heater body and a driving controller arranged on an external power cable of the heater body; the heater body includes a heating stick and a temperature probe; the driving controller includes a controller housing and a control circuit board arranged inside the controller housing; the driving controller is arranged in the heater; a control circuit board includes: an input protection module; a rectification and filtering module connected to the input protection module; a power conversion module connected to the rectification and filtering module; a 5V output module connected to the power conversion module; a main control module connected to the 5V output module; a touch function module, an on-off control module, a temperature detection module, a temperature display module, an indicator light module, and a buzzer module which are respectively connected to the main control module; and a heating control module connected to the on-off control module; the on-off control module is further respectively connected to a water shortage detection module and the temperature detection module; the heating stick is connected to the heating control module; and the temperature probe is connected to the temperature detection module. By using the above solution, first, since the input protection module is arranged in the control circuit board, when an overload is input, the heater can be powered off in time, thereby protecting the safety of a user. Second, since the touch function module, the temperature display module, the indicator light module, and the buzzer module are arranged in the control circuit board, a temperature of the heater can be precisely controlled through the above settings, and the user can be pre-warned in time that the heating has been completed. Thus, based on precise control, the user experience is enhanced.

BRIEF DESCRIPTION OF THE DRAWINGS

To describe the technical solutions in the embodiments of the present disclosure more clearly, the following briefly introduces the accompanying drawings for describing the embodiments. Obviously, the accompanying drawings in the following description show merely some embodiments of the present disclosure, and a person of ordinary skill in the art may still derive other drawings from the accompanying drawings without creative efforts. These all fall within the protection scope of the present disclosure.

DETAILED DESCRIPTION OF THE EMBODIMENTS

The technical solutions in the embodiments of the present disclosure are clearly and completely described below. Apparently, the described embodiments are merely some embodiments of the present disclosure, rather than all of the embodiments. All other embodiments obtained by a person of ordinary skill in the art based on the embodiments of the present disclosure without making creative efforts shall fall within the protection scope of the present disclosure.

Therefore, the following detailed descriptions of the embodiments of the present disclosure provided in the accompanying drawings are not intended to limit the scope of the claimed present disclosure, but merely represents selected embodiments of the present disclosure. It should be noted that features in the embodiments of the present disclosure may be mutually combined without conflicts. The combined embodiments still fall within the protection scope of the present disclosure.

In the description of the present disclosure, it should be noted that unless otherwise specified and limited, the terms “arrange”, “mount”, “connect”, and “connection” should be broadly understood. For example, it can be a fixed connection, rotational connection, integrated connection, mechanical connection, electrical connection, direct connection, indirect connection via an intermediate element, or internal communication between two elements. For those of ordinary skill in the art, the specific meanings of the aforementioned terms in the present disclosure can be understood based on specific conditions.

Heaters in the prior art are generally configured to heat a water source such as a fish tank, a portable swimming pool, and a bathtub. The traditional heater can prevent dry burning through a temperature detector, which means that if the temperature detector detects that a temperature of water has not reached a preset value, the heater will continue to heat the water source, and will stop the heating until the temperature detector detects that the temperature of the water has reached the preset value. However, a control circuit board of the traditional heater can only achieve a logic determination function of the temperature detector to control a heating stick to be turned on and turned off, so that the function is relatively single and cannot satisfy increasing demands. Thus, designing a heater that can be accurately controlled and is safe enough is designed becomes a problem urgently needing to be solved by those skilled in the art.

Figure 1:
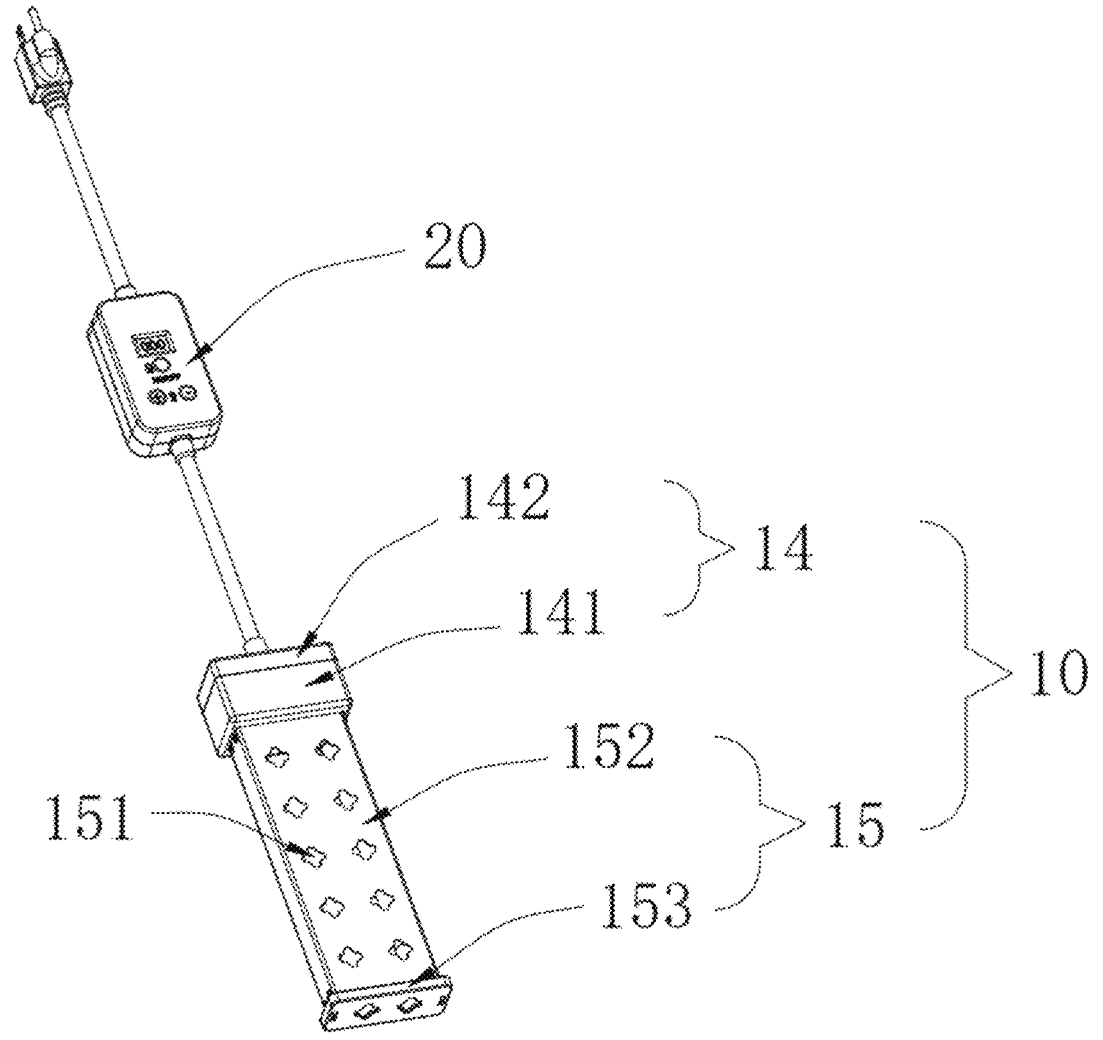
FIG. 1 is a schematic diagram of a three-dimensional structure of a heater according to the present disclosure.
Figure 2:
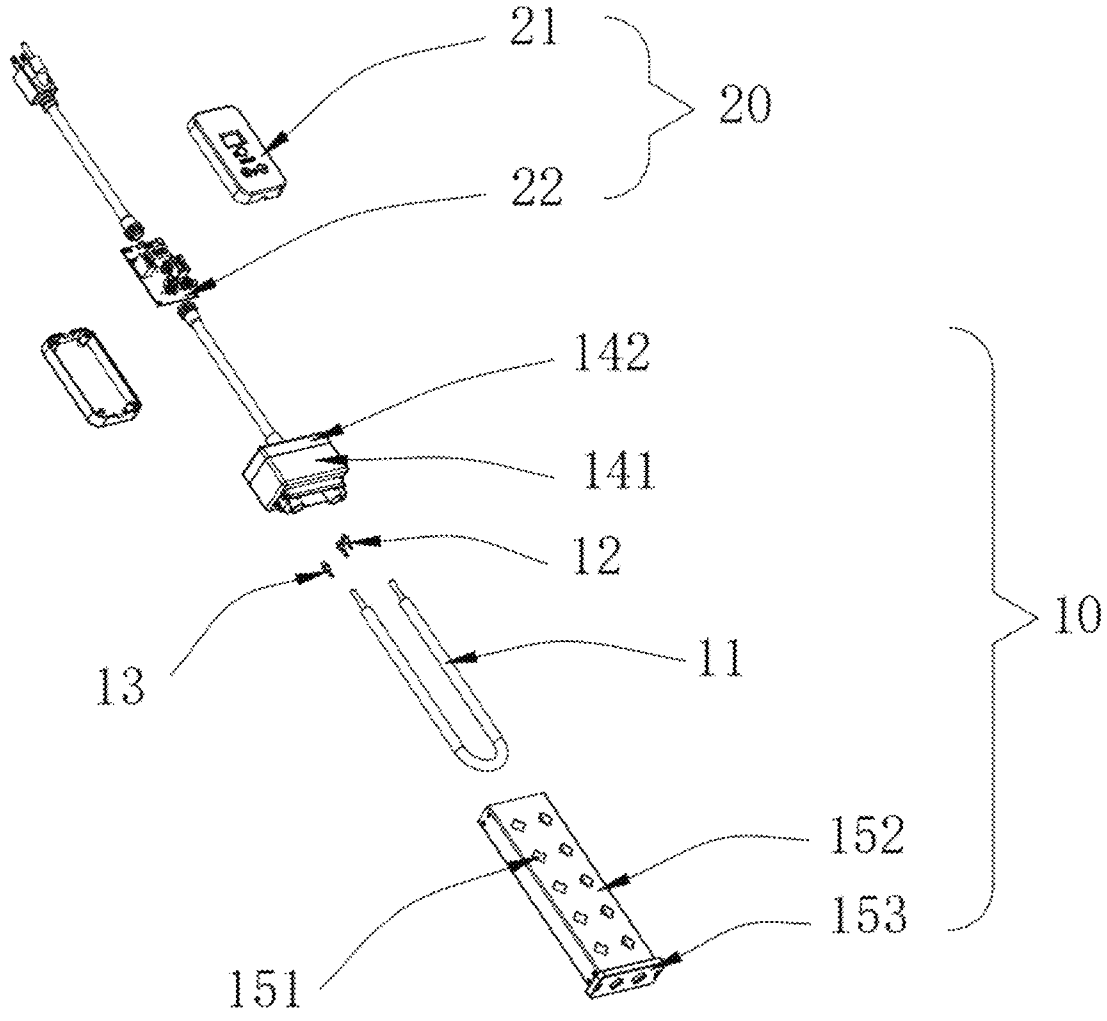
FIG. 2 is an exploded view of the heater shown in FIG. 1.
Figure 3:
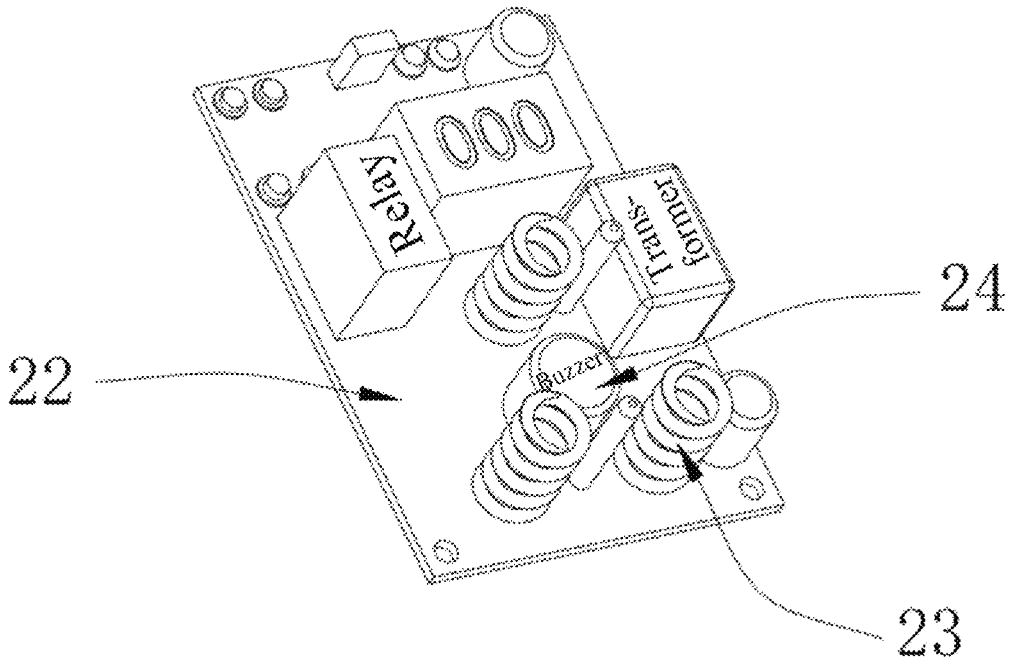
FIG. 3 is a schematic diagram of a structure of a control circuit board of the heater shown in FIG. 2.
Figure 4:
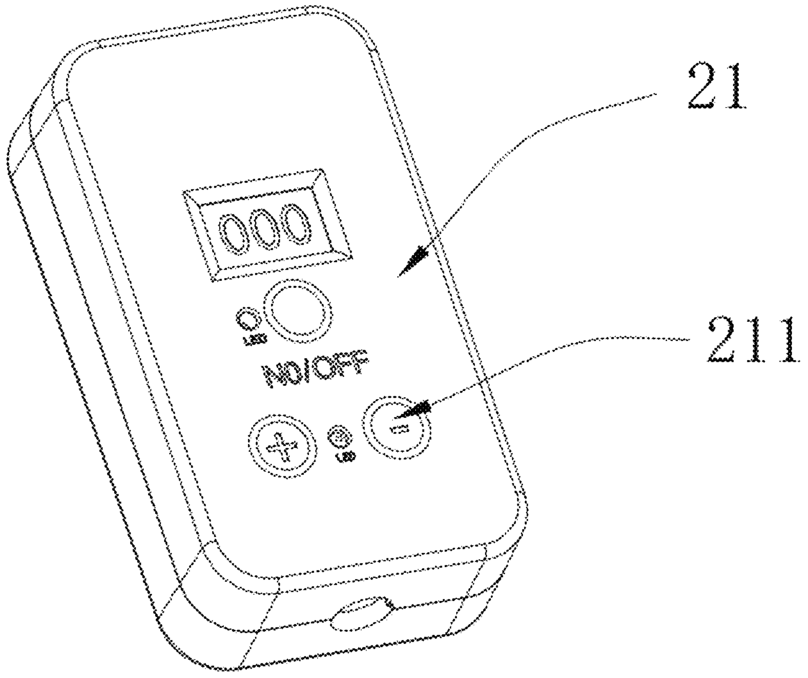
FIG. 4 is a schematic diagram of a structure of a controller housing of the heater shown in FIG. 2.
Figure 5:
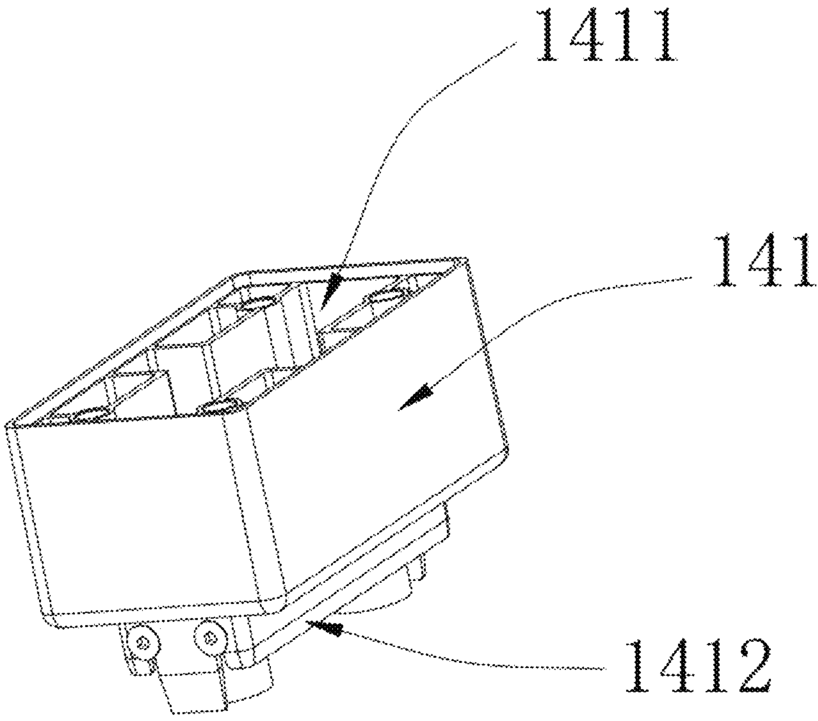
FIG. 5 is a schematic diagram of a structure of a mounting base housing of the heater shown in FIG. 2.
Figure 6:
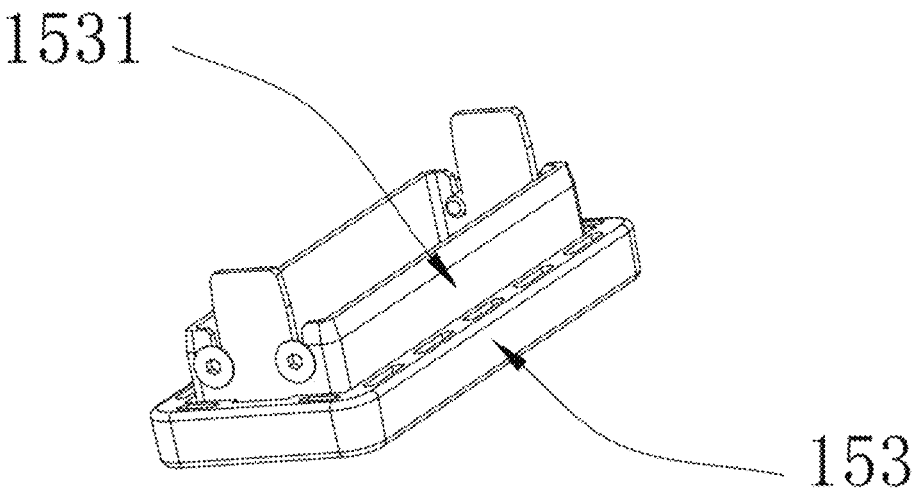
FIG. 6 is a schematic diagram of a structure of a housing plug of the heater shown in FIG. 2.
Figure 7:
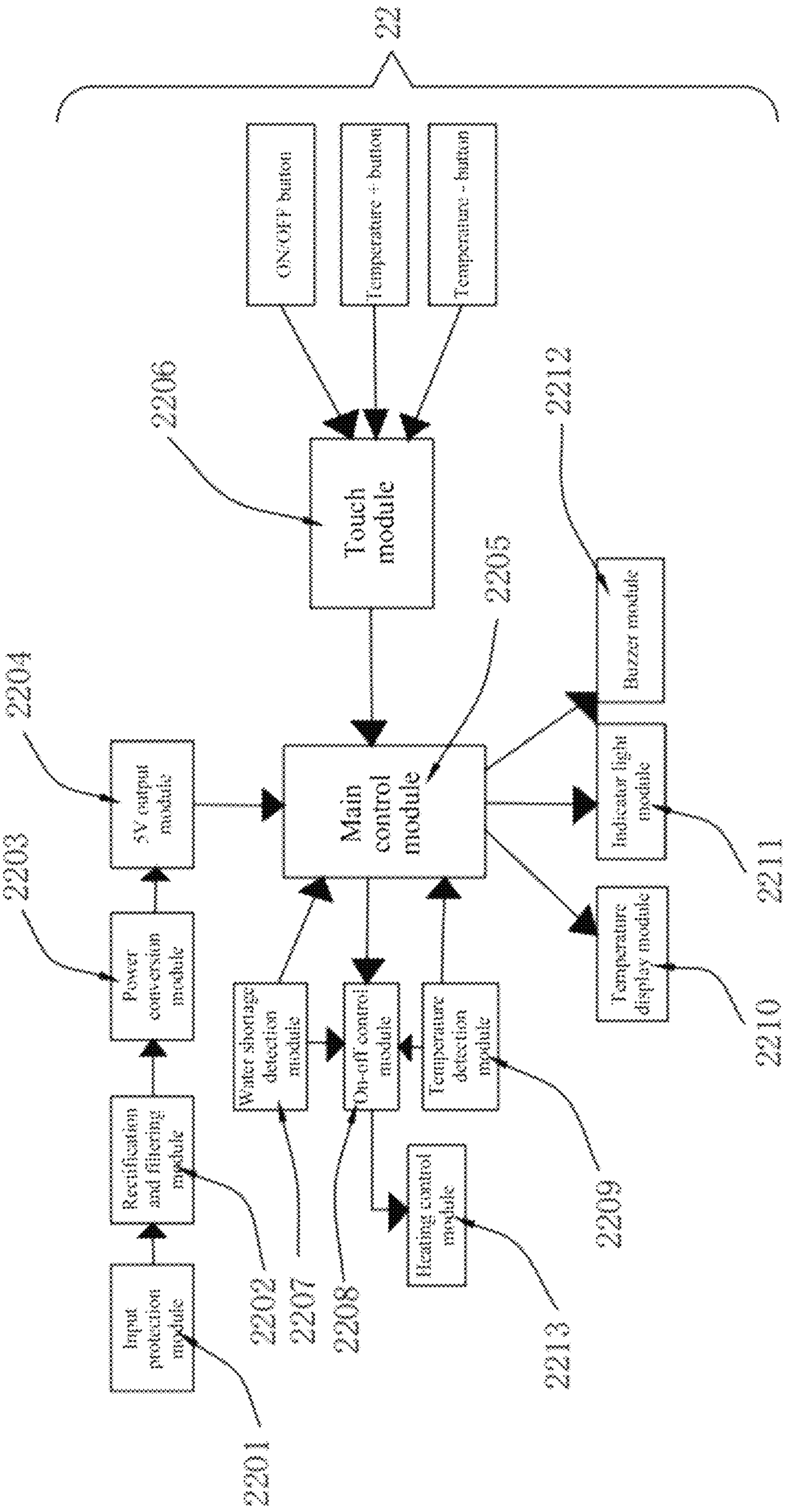
FIG. 7 is a schematic diagram of a control circuit board of the heater shown in FIG. 2.
Figure 8:
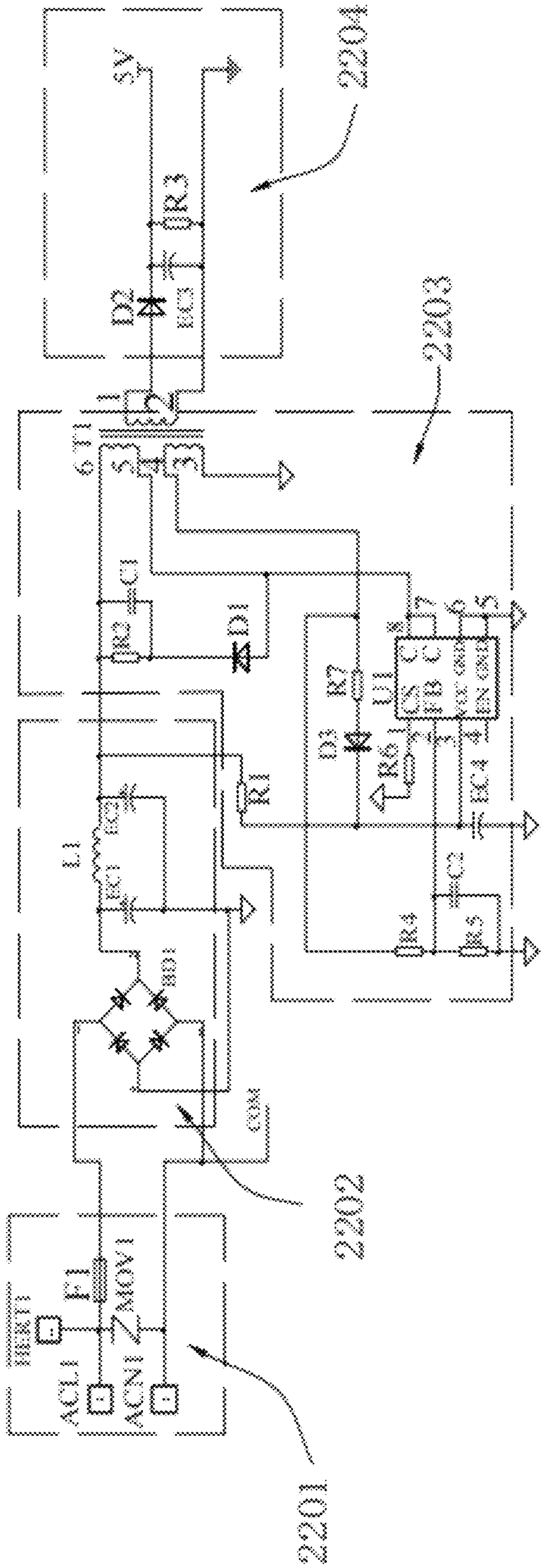
FIG. 8 is a circuit diagram of an input protection module, a rectification and filtering module, a power conversion module, and a 5V output module of the heater.
Figure 9:
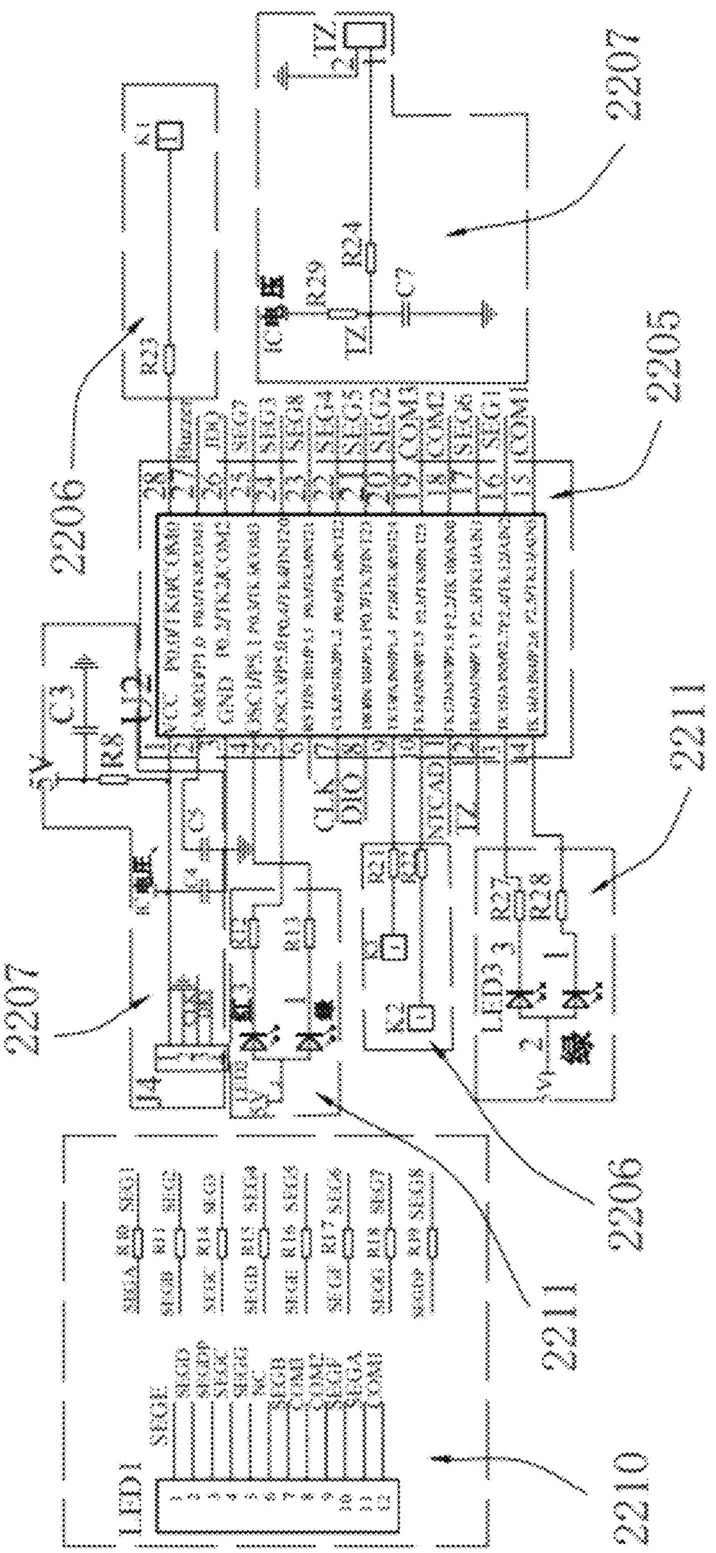
FIG. 9 is a circuit diagram of a touch function module, a water shortage detection module, an indicator light module, a main control module, and a temperature display module of the heater.
Figure 10:
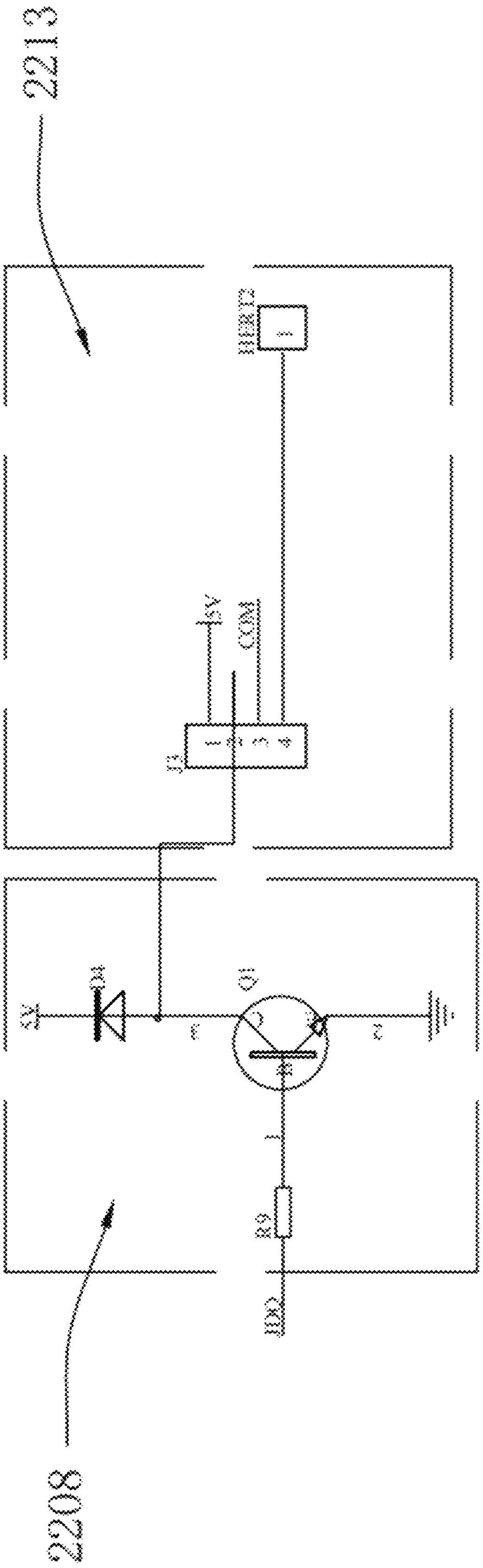
FIG. 10 is a circuit diagram of an on-off control module and a heating control module of the heater.
Figure 11:
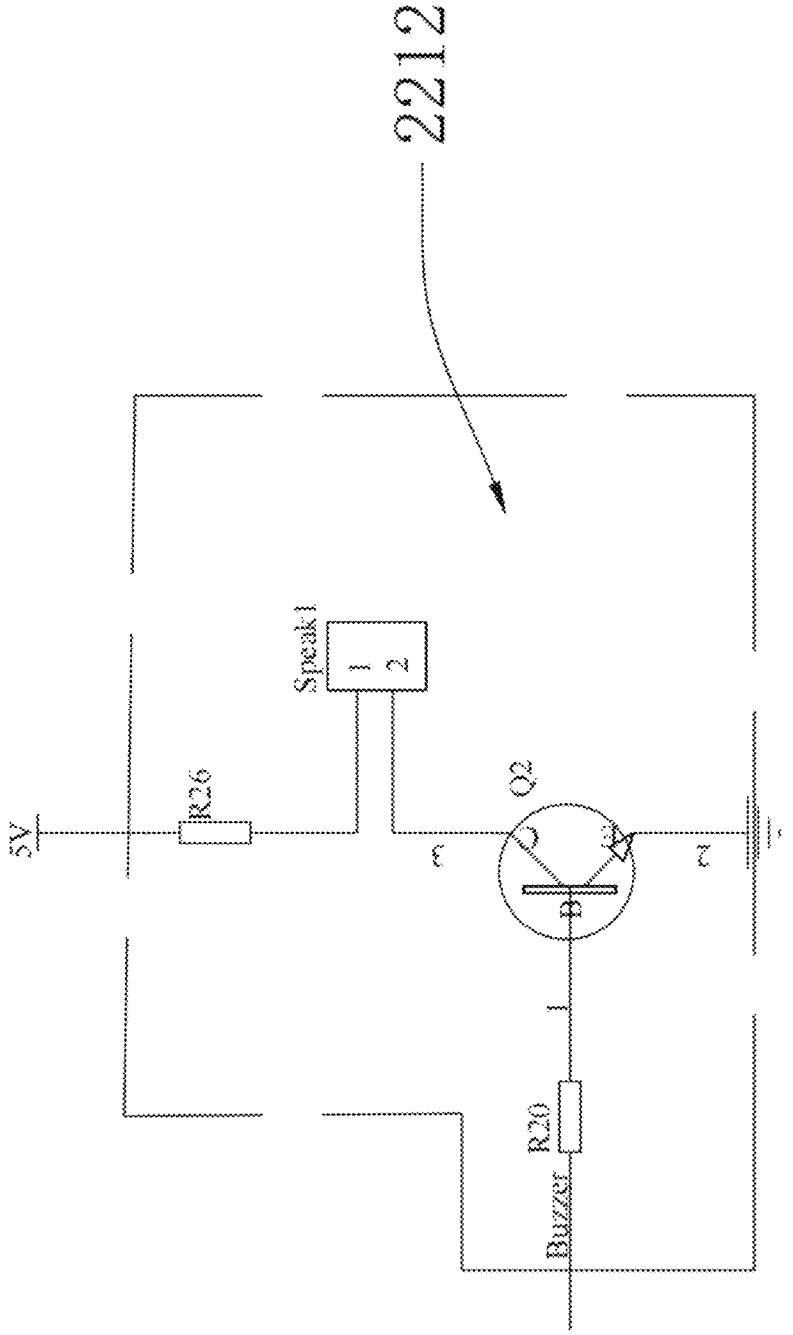
FIG. 11 is a circuit diagram of a buzzer module of the heater.
Figure 12:
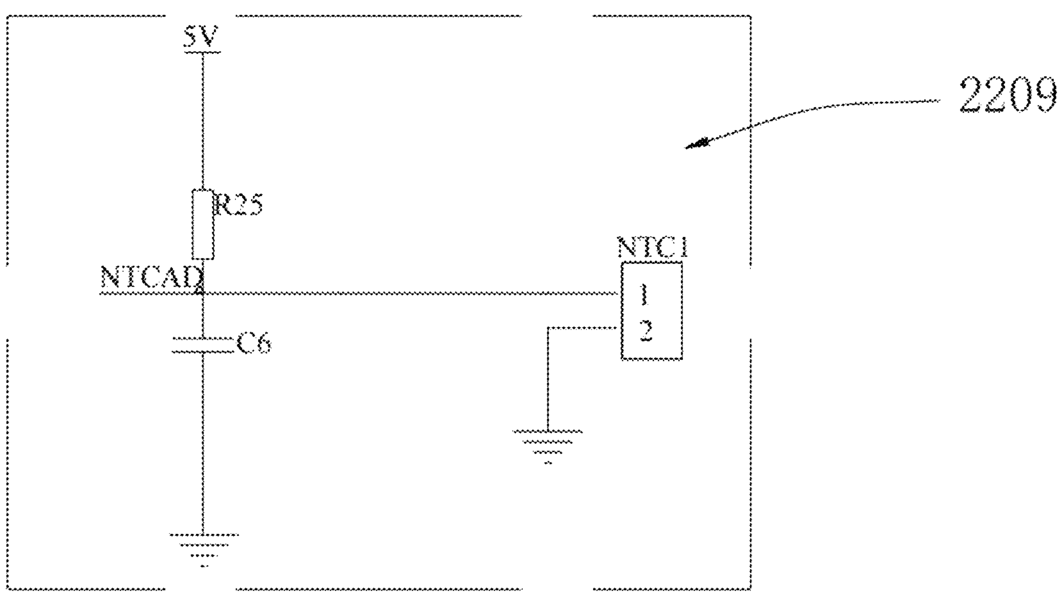
FIG. 12 is a circuit diagram of a temperature detection module of the heater.

As shown in FIG. 1, FIG. 2, FIG. 3, FIG. 4, FIG. 5, FIG. 6, FIG. 7, FIG. 8, FIG. 9, FIG. 10, FIG. 11, and FIG. 12, an embodiment of the present disclosure provides a heater, including a heater body 10 and a driving controller 20 arranged on an external power cable of the heater body 10. The heater body 10 includes: a heating stick 11, two leaving probes 12, and a temperature probe 13. The driving controller includes 20: a controller housing 21 and a control circuit board 22 arranged inside the controller housing 21.

The control circuit board 22 includes: an input protection module 2201; a rectification and filtering module 2202 connected to the input protection module 2201; a power conversion module 2203 connected to the rectification and filtering module 2202; an output module 2204 connected to the power conversion module 2203; a main control module 2205 connected to the output module 2204; a touch function module 2206, a water shortage detection module 2207, an on-off control module 2208, a temperature detection module 2209, a temperature display module 2210, an indicator light module 2211, and a buzzer module 2212 which are respectively connected to the main control module 2205; and a heating control module 2213 connected to the on-off control module 2208; the on-off control module 2208 is further connected to the water shortage detection module 2207 and the temperature detection module 2209. In this implementation, the output module 2204 is a 5V output module 2204. It can be understood that in other implementations, the output module 2204 shown may be at another voltage. The present disclosure does not limit this.

The heating stick 11 is connected to the heating control module 2213. The two water shortage probes 12 are connected to the water shortage detection module 2207; and the temperature probe 13 is connected to the temperature detection module 2209.

In the present disclosure, by using the above solution, first, since the input protection module 2201 is arranged in the control circuit board 22, when an overload is input, the heater can be powered off in time, thereby protecting the safety of a user. Since the touch function module 2206, the temperature display module 2210, the indicator light module 2211, and the buzzer module 2212 are arranged in the control circuit board 22, a temperature of the heater can be precisely controlled through the above settings, and the user can be pre-warned in time that the heating has been completed. Thus, based on precise control, the user experience is enhanced.

Second, the two water shortage probes 12 are arranged in the heater. The driving controller 20 acquires data of the temperature probe 13 and the two water shortage probes 12 for processing. That is, when the two water shortage probes 12 are in on states, it indicates that the heater is in an aqueous solution. In this way, the heater works normally and stops the heating until a temperature detected by the temperature probe 13 has reached a preset temperature. When the two water shortage probes 12 are in off states, it indicates that the heater is separated from the aqueous solution or is partially in the aqueous solution. In this way, the heater is not turned on, which can prevent dry burning in the heater and accurately determine whether the heater is in water and whether the heater can heat a water source, thus overcoming the problem that the traditional heater is prone to dry burning.

Specifically, the input protection module 2201 is a fuse, and the rectification and filtering module 2202 includes a rectifier bridge DB1.

One end of the input protection module 2201 is connected to a live wire, and the other end of the input protection module 2201 is connected to a first pin of the rectifier bridge BD1; and a third pin of the rectifier bridge BD1 is connected to a neutral wire.

Specifically, the rectification and filtering module 2202 further includes: a capacitor EC1, a capacitor EC2, and an inductor L1;

one end of the capacitor EC1 is respectively connected to a second pin of the rectifier bridge BD1 and one end of the inductor L1; the other end of the capacitor EC1 is respectively connected to a fourth pin of the rectifier bridge BD1 and the capacitor EC2; and the other end of the inductor L1 is connected to the other end of the capacitor EC2.

Specifically, the power conversion module 2203 includes: a capacitor C1, a capacitor C2, a capacitor CE4, a resistor R1, a resistor R2, a resistor R4, a resistor R5, a resistor R6, a resistor R7, a diode D1, a diode D3, a chip U1, and a transformer T1. The 5V output module 2204 includes: a capacitor CE3, a resistor R3, and a diode D2.

The other end of the inductor L1 and the other end of the capacitor EC2 are respectively connected to one end of the resistor R1, one end of the resistor R2, one end of the capacitor C1, and a sixth pin of the transformer T1; the other end of the resistor R1 is respectively connected to one end of the diode D3, one end of the capacitor CE4, and a third pin of the chip U1; the other end of the capacitor CE4 is grounded; the other end of the resistor R2 and the other end of the capacitor C1 are respectively connected to one end of the diode D1; the other end of the diode D1 is respectively connected to a seventh pin of the chip U1, an eighth pin of the chip U1, and a fifth pin of the transformer T1; the other end of the diode D3 is connected to one end of the resistor R7; the other end of the resistor R7 is connected to one end of the resistor R4 and a fourth pin of the transformer T1; the other end of the resistor R4 is connected to one end of the resistor R5, one end of the capacitor C2, and a second pin of the chip U1; the other end of resistor R5 is connected to the ground and the other end of the capacitor C2; a first pin of the chip U1 is connected to one end of the resistor R6; the other end of the resistor R6 is connected to the ground; a fifth pin and sixth pin of the chip U1 are connected to the ground; and a third pin of the transformer T1 is connected to the ground.

One end of the diode D2 is connected to a first pin of the transformer T1; the other end of the diode D2 is respectively connected to one end of the capacitor CE3 and one end of the resistor R3; and the other end of the capacitor CE3 and the other end of the resistor R3 are connected to a second pin of the transformer T1 and the ground.

Specifically, the main control module 2205 is a chip U2; the water shortage detection module 2207 includes: a relay J4, a resistor R8, a resistor R24, a resistor R29, a capacitor C3, a capacitor C4, a capacitor C5, a capacitor C7, and a terminal TZ; a first pin of the relay J4 is respectively connected to one end of the resistor R29, one end of the resistor R8, one end of the capacitor C4, and a first pin of the chip U2; the other end of the resistor R8 is respectively connected to one end of the resistor R3 and one end of the capacitor C3; the other end of the capacitor C3 is connected to the ground; the other end of the resistor R29 is respectively connected to a twelfth pin of the chip U2, one end of the resistor R24, and one end of the capacitor C7; the other end of the capacitor C7 is connected to the ground; the other end of the resistor R24 is connected to a first pin of the terminal TZ; a second pin of the terminal TZ is connected to the ground; the other end of the capacitor C4 and one end of the capacitor C5 are connected to the third pin of the chip U2 and the ground; the other end of the capacitor C5 is connected to a second pin of the chip U2; a second pin of the relay J4 is connected to the ground; a third pin of the relay J4 is connected to a seventh pin of the chip U2; a fourth pin of the relay J4 is connected to an eighth pin of the chip U2; and the two water shortage probes 12 are electrically connected to the terminal TZ.

The on-off control module 2208 includes: a triode Q1, a resistor R9, and a diode D4; a first pin of the triode Q1 is connected to one end of the resistor R9; the other end of the resistor R9 is connected to a twenty-sixth pin of the chip U2; a second pin of the triode Q1 is connected to ground; a third pin of the triode Q1 is connected to one end of the diode D4; and the other end of the diode D4 is connected to one end of the resistor R3.

The heating control module 2213 includes: a relay J3 and a terminal HERT2; a first pin of the relay J3 is connected to one end of the resistor R3; a second pin of the relay J3 is connected to one end of the diode D4 and a third pin of the triode Q1; a third pin of the relay J3 is connected to a neutral wire; a fourth pin of the relay J3 is connected to the terminal HERT2; and the heating stick 11 is connected to the terminal HERT2.

The temperature detection module 2209 includes: a resistor R25, a capacitor C6, and a terminal NTC1; one end of the resistor R25 is connected to one end of the resistor R3, and the other end of the resistor R25 is respectively connected to an eleventh pin of the chip U2, one end of the capacitor C6, and a first pin of the terminal NTC1; the other end of the capacitor C6 is connected to the ground; a second pin of the terminal NTC1 is connected to the ground; and the temperature probe 13 is connected to the terminal NTC1.

Specifically, the temperature display module 2210 includes: a digital light-emitting diode (LED) 1 tube, a resistor R10, a resistor R11, a resistor R14, resistor R15, a resistor R16, a resistor R17, a resistor R18, and a resistor R19; the driving controller 20 further includes a display screen; the display screen is embedded in a position, located at the digital LED1 tube, on the controller housing 21; a first pin of the digital LED1 tube is connected to one end of the R16; the other end of the R16 is connected to a sixteenth pin of the chip U2; a second pin of the digital LED1 tube is connected to one end of the R15; the other end of the R15 is connected to a twenty-second pin of the chip U2; a third pin of the digital LED1 tube is connected to one end of the R19; the other end of the R19 is connected to a twenty-third pin of the chip U2; a fourth pin of the digital LED1 tube is connected to one end of the R14; the other end of the R14 is connected to a twenty-fourth pin of the chip U2; a fifth pin of the digital LED1 tube is connected to one end of the R18; the other end of the R18 is connected to a twenty-fifth pin of the chip U2; a sixth pin of the digital LED1 tube is a normally closed contact; a seventh pin of the digital LED1 tube is connected to one end of the R11; the other end of the R11 is connected to a twentieth pin of the chip U2; an eighth pin of the digital LED1 tube is connected to a nineteenth pin of the chip U2; a ninth pin of the digital LED1 tube is connected to an eighteenth pin of the chip U2; a tenth pin of the digital LED1 tube is connected to one end of the R17; the other end of the R17 is connected to a seventeenth pin of the chip U2; an eleventh pin of the digital LED1 tube is connected to one end of the R10; the other end of the R10 is connected to a sixteenth pin of the chip U2; and a twelfth pin of the digital LED1 tube is connected to a fifteenth pin of the chip U2.

The indicator light module 2211 includes: a red LED2, a green LED2, a resistor R12, a resistor R13, a red LED3, a green LED3, a resistor R27, and a resistor R28; one end of the red LED2 and one end of the green LED2 are connected to one end of the resistor R3; the other end of the red LED2 is connected to one end of the resistor R12; the other end of the resistor R12 is connected to a fifth pin of the chip U2; the other end of the green LED2 is connected to one end of the resistor R13; the other end of the resistor R13 is connected to a fourth pin of the chip U2; one end of the red LED3 and one end of the green LED3 are connected to one end of the resistor R3; the other end of the red LED 3 is connected to one end of the resistor R27; the other end of the resistor R27 is connected to a thirteenth pin of the chip U2; the other end of the green LED3 is connected to one end of the resistor R28; and the other end of the resistor R28 is connected to a fourteenth pin of the chip U2.

The buzzer module 2212 includes: a triode Q2, a resistor R20, a resistor R26, and a terminal Speak1; the driving controller 20 further includes a buzzer body 24; one end of the resistor R20 is connected to a twenty-seventh pin of the chip U2; the other end of the resistor R20 is connected to a first pin of the triode Q2; a second pin of the triode Q2 is connected to the ground; a third pin of the triode Q2 is connected to a first pin of the terminal Speak1; a second pin of the terminal Speak1 is connected to one end of the resistor R26; the other end of the resistor R26 is connected to one end of the resistor R3; and the buzzer body 24 is electrically connected to the terminal Speak1. The buzzer body 24 is configured to play a prompt tone in case of dry burning, to warn a user of the dry burning.

Specifically, the touch function module 2206 includes: a button K1, a button K2, a button K3, a resistor R21, a resistor R22, and a resistor R23; the driving controller 20 further includes touch springs 23; the controller housing 21 is provided with touch areas 211 at positions corresponding to the button K1, the button K2, and the button K3; and the touch springs 23 are sandwiched between the buttons K1, K2, K3, and the corresponding touch areas 211. The touch function module 2206 can control turning on, turning off, temperature rise, and temperature drop of the heater.

One end of the button K1 is connected to the resistor R23; the other end of the resistor R23 is connected to a twenty-eighth of the chip U2; one end of the button K2 is connected to the resistor R22; the other end of the resistor R22 is connected to a tenth pin of the chip U2; one end of the button K3 is connected to the resistor R21; and the other end of the resistor R21 is connected to a ninth pin of the chip U2.

Specifically, the heater body 10 further includes a mounting base 14 and a heater housing 15. The heating stick 11 is mounted on one side of the mounting base 14. The heater housing 15 is mounted on one side of the mounting base 14 and is covered at the heating stick 11.

The two water shortage probes 12 are mounted at a position, located inside the heater housing 15, on one side of the mounting base 14. The temperature probe 13 is mounted at a position, located outside the heater housing 15, on one side of the mounting base 14. A plurality of hollow holes 151 are provided in the heater housing 15.

Specifically, the mounting base 14 includes: a mounting base housing 141 and a mounting base rear cover 142.

An accommodating slot 1411 is provided in the other side of the mounting base housing 141; the heating stick 11, the two water shortage probes 12, and the temperature probe 13 extend into the accommodating slot 1411 for being fixed after passing through one side of the mounting base rear cover 142. The mounting base rear cover 142 is fixed at an opening of the accommodating slot 1411. A power cable connected to the driving controller 20 is respectively electrically connected to the heating stick 11, the two water shortage probes 12, and the temperature probe 13 through the mounting base rear cover 142.

Specifically, the heater housing 15 includes a housing body 152 and a housing plug 153.

One side of the mounting base housing 141 extends towards the housing body 152 to form a first fixed flange 1412. After the housing body 152 sleeves the first fixed flange 1412, a fixing screw extends into the first fixed flange 1412 for fixing through the housing body 152. One side of the housing plug 153 extends towards the housing body 152 to form a second fixed flange 1531. After the housing body 152 sleeves the second fixed flange 1531, a fixing screw extends into the second fixed flange 1531 for fixing through the housing body 152.

The working principle of the heater is as follows:

The input protection module 2201 is used for performing overcurrent protection on an input. The temperature detection module 2209 controls a set temperature. The water shortage detection module 2207 is configured to avoid dry burning of the heating stick 11. After an alternating current voltage is rectified by the rectifier bridge DB1 of the rectification and filtering module 2202 and is then filtered by the capacitor EC1 and the capacitor EC2, a relatively pure direct current voltage is obtained. The chip U1 and transformer T1 of the power conversion circuit form a two-tube forward topology. When the chip U1 starts to work, a pulse-width modulation (PWM) driving wave is emitted, to drive a built-in metal oxide semiconductor (MOS) transistor of the chip U1 to work. A bus direct current voltage is converted into a square wave voltage during switching on and switching off of the built-in MOS transistor of the chip U1. A primary coil of the transformer T1 generates excitation inductance under the action of the square wave to transfer energy to a secondary side inductor. The secondary side generates a corresponding alternating voltage square wave. The square wave is rectified and filtered by the diode D2 and the capacitor EC3 into a low voltage direct current. An output of 5 V is output after being rectified and filtered by the diode D2. The chip U2 receives actions of the buttons K1, K2, and K3 to control the heating stick 11 to be turned on and turned off. Touching the buttons K1, K2, and K3 outputs low and high levels which are transmitted to the main control chip U2. When the buttons act, the chip U2 of the buzzer module 2212 outputs a PWM to control the triode Q2. The indicator light module 2211 controls LED2 and LED3 to be turned on and turned off by the chip U2. The temperature display module 2210 displays a real-time temperature and a set temperature by the digital LED1 tube. The modules for detection output and transmit signals to the main control chip U2 through the terminal NTC and the terminal TZ terminal. The on-off control module 2208 is controlled by the triode Q1 to turn on/off the relay J3. The heating control module is controlled by the relay J3 to determine whether to power on or power off the heating stick 11.

The above provides a detailed explanation of the present disclosure in conjunction with the accompanying drawings, but the present disclosure is not limited to the described implementations. For those skilled in the art, various changes, modifications, substitutions, and variations of these implementations without departing from the principle and spirit of the present disclosure still fall within the protection scope of the present disclosure.

What is claimed is:

1. A heater, comprising: a heater body and a driving controller arranged on an external power cable of the heater body, wherein the heater body comprises: a heating stick and a temperature probe; the driving controller comprises: a controller housing and a control circuit board arranged inside the controller housing;

the control circuit board comprises: an input protection module; a rectification and filtering module connected to the input protection module; a power conversion module connected to the rectification and filtering module; an output module connected to the power conversion module; a main control module connected to the output module; a touch function module, an on-off control module, a temperature detection module, a temperature display module, an indicator light module, and a buzzer module which are respectively connected to the main control module; and a heating control module connected to the on-off control module; the on-off control module is further connected to the temperature detection module;

the heating stick is connected to the heating control module; and the temperature probe is connected to the temperature detection module.

2. The heater according to claim 1, wherein the heater body further comprises two water shortage probes, and the control circuit board module further comprises a water shortage detection module;

the on-off control module is further connected to the water shortage detection module; and two water shortage probes are connected to the water shortage detection module.

3. The heater according to claim 2, wherein the input protection module is a fuse, and the rectification and filtering module comprises a rectifier bridge DB1;

one end of the input protection module is connected to a live wire, and the other end of the input protection module is connected to a first pin of the rectifier bridge BD1; and a third pin of the rectifier bridge BD1 is connected to a neutral wire.

4. The heater according to claim 3, wherein the rectification and filtering module further comprises: a capacitor EC1, a capacitor EC2, and an inductor L1;

one end of the capacitor EC1 is respectively connected to a second pin of the rectifier bridge BD1 and one end of the inductor L1; the other end of the capacitor EC1 is respectively connected to a fourth pin of the rectifier bridge BD1 and the capacitor EC2; and the other end of the inductor L1 is connected to the other end of the capacitor EC2.

5. The heater according to claim 4, wherein the power conversion module comprises: a capacitor C1, a capacitor C2, a capacitor CE4, a resistor R1, a resistor R2, a resistor R4, a resistor R5, a resistor R6, a resistor R7, a diode D1, a diode D3, a chip U1, and a transformer T1; the 5V output module comprises: a capacitor CE3, a resistor R3, and a diode D2;

the other end of the inductor L1 and the other end of the capacitor EC2 are respectively connected to one end of the resistor R1, one end of the resistor R2, one end of the capacitor C1, and a sixth pin of the transformer T1; the other end of the resistor R1 is respectively connected to one end of the diode D3, one end of the capacitor CE4, and a third pin of the chip U1; the other end of the capacitor CE4 is grounded; the other end of the resistor R2 and the other end of the capacitor C1 are respectively connected to one end of the diode D1; the other end of the diode D1 is respectively connected to a seventh pin of the chip U1, an eighth pin of the chip U1, and a fifth pin of the transformer T1; the other end of the diode D3 is connected to one end of the resistor R7; the other end of the resistor R7 is connected to one end of the resistor R4 and a fourth pin of the transformer T1; the other end of the resistor R4 is connected to one end of the resistor R5, one end of the capacitor C2, and a second pin of the chip U1; the other end of resistor R5 is connected to the ground and the other end of the capacitor C2; a first pin of the chip U1 is connected to one end of the resistor R6; the other end of the resistor R6 is connected to the ground; a fifth pin and sixth pin of the chip U1 are connected to the ground; a third pin of the transformer T1 is connected to the ground;

one end of the diode D2 is connected to a first pin of the transformer T1; the other end of the diode D2 is respectively connected to one end of the capacitor CE3 and one end of the resistor R3; and the other end of the capacitor CE3 and the other end of the resistor R3 are connected to a second pin of the transformer T1 and the ground.

6. The heater according to claim 5, wherein the main control module is a chip U2; the water shortage detection module comprises: a relay J4, a resistor R8, a resistor R24, a resistor R29, a capacitor C3, a capacitor C4, a capacitor C5, a capacitor C7, and a terminal TZ; a first pin of the relay J4 is respectively connected to one end of the resistor R29, one end of the resistor R8, one end of the capacitor C4, and a first pin of the chip U2; the other end of the resistor R8 is respectively connected to one end of the resistor R3 and one end of the capacitor C3; the other end of the capacitor C3 is connected to the ground; the other end of the resistor R29 is respectively connected to a twelfth pin of the chip U2, one end of the resistor R24, and one end of the capacitor C7; the other end of the capacitor C7 is connected to the ground; the other end of the resistor R24 is connected to a first pin of the terminal TZ; a second pin of the terminal TZ is connected to the ground; the other end of the capacitor C4 and one end of the capacitor C5 are connected to the third pin of the chip U2 and the ground; the other end of the capacitor C5 is connected to a second pin of the chip U2; a second pin of the relay J4 is connected to the ground; a third pin of the relay J4 is connected to a seventh pin of the chip U2; a fourth pin of the relay J4 is connected to an eighth pin of the chip U2; the two water shortage leaving probes are electrically connected to the terminal TZ;

the on-off control module comprises: a triode Q1, a resistor R9, and a diode D4; a first pin of the triode Q1 is connected to one end of the resistor R9; the other end of the resistor R9 is connected to a twenty-sixth pin of the chip U2; a second pin of the triode Q1 is connected to ground; a third pin of the triode Q1 is connected to one end of the diode D4; the other end of the diode D4 is connected to one end of the resistor R3;

the heating control module comprises: a relay J3 and a terminal HERT2; a first pin of the relay J3 is connected to one end of the resistor R3; a second pin of the relay J3 is connected to one end of the diode D4 and a third pin of the triode Q1; a third pin of the relay J3 is connected to a neutral wire; a fourth pin of the relay J3 is connected to the terminal HERT2; the heating stick is connected to the terminal HERT2;

the temperature detection module comprises: a resistor R25, a capacitor C6, and a terminal NTC1; one end of the resistor R25 is connected to one end of the resistor R3, and the other end of the resistor R25 is respectively connected to an eleventh pin of the chip U2, one end of the capacitor C6, and a first pin of the terminal NTC1; the other end of the capacitor C6 is connected to the ground; a second pin of the terminal NTC1 is connected to the ground; and the temperature probe is connected to the terminal NTC1.

7. The heater according to claim 6, wherein the temperature display module comprises: a digital light-emitting diode (LED) 1 tube, a resistor R10, a resistor R11, a resistor R14, resistor R15, a resistor R16, a resistor R17, a resistor R18, and a resistor R19; the driving controller further comprises a display screen; the display screen is embedded in a position, located at the digital LED1 tube, on the controller housing; a first pin of the digital LED1 tube is connected to one end of the R16; the other end of the R16 is connected to a sixteenth pin of the chip U2; a second pin of the digital LED1 tube is connected to one end of the R15; the other end of the R15 is connected to a twenty-second pin of the chip U2; a third pin of the digital LED1 tube is connected to one end of the R19; the other end of the R19 is connected to a twenty-third pin of the chip U2; a fourth pin of the digital LED1 tube is connected to one end of the R14; the other end of the R14 is connected to a twenty-fourth pin of the chip U2; a fifth pin of the digital LED1 tube is connected to one end of the R18; the other end of the R18 is connected to a twenty-fifth pin of the chip U2; a sixth pin of the digital LED1 tube is a normally closed contact; a seventh pin of the digital LED1 tube is connected to one end of the R11; the other end of the R11 is connected to a twentieth pin of the chip U2; an eighth pin of the digital LED1 tube is connected to a nineteenth pin of the chip U2; a ninth pin of the digital LED1 tube is connected to an eighteenth pin of the chip U2; a tenth pin of the digital LED1 tube is connected to one end of the R17; the other end of the R17 is connected to a seventeenth pin of the chip U2; an eleventh pin of the digital LED1 tube is connected to one end of the R10; the other end of the R10 is connected to a sixteenth pin of the chip U2; a twelfth pin of the digital LED1 tube is connected to a fifteenth pin of the chip U2;

the indicator light module comprises: a red LED2, a green LED2, a resistor R12, a resistor R13, a red LED3, a green LED3, a resistor R27, and a resistor R28; one end of the red LED2 and one end of the green LED2 are connected to one end of the resistor R3; the other end of the red LED2 is connected to one end of the resistor R12; the other end of the resistor R12 is connected to a fifth pin of the chip U2; the other end of the green LED2 is connected to one end of the resistor R13; the other end of the resistor R13 is connected to a fourth pin of the chip U2; one end of the red LED3 and one end of the green LED3 are connected to one end of the resistor R3; the other end of the red LED 3 is connected to one end of the resistor R27; the other end of the resistor R27 is connected to a thirteenth pin of the chip U2; the other end of the green LED3 is connected to one end of the resistor R28; the other end of the resistor R28 is connected to a fourteenth pin of the chip U2;

the buzzer module comprises: a triode Q2, a resistor R20, a resistor R26, and a terminal Speak1; the driving controller further comprises a buzzer body; one end of the resistor R20 is connected to a twenty-seventh pin of the chip U2; the other end of the resistor R20 is connected to a first pin of the triode Q2; a second pin of the triode Q2 is connected to the ground; a third pin of the triode Q2 is connected to a first pin of the terminal Speak1; a second pin of the terminal Speak1 is connected to one end of the resistor R26; the other end of the resistor R26 is connected to one end of the resistor R3; and the buzzer body is electrically connected to the terminal Speak1.

8. The heater according to claim 6, wherein the touch function module comprises: a button K1, a button K2, a button K3, a resistor R21, a resistor R22, and a resistor R23; the driving controller further comprises touch springs;

the controller housing is provided with touch areas at positions corresponding to the button K1, the button K2, and the button K3; the touch springs are sandwiched between the buttons K1, K2, K3, and the corresponding touch areas;

one end of the button K1 is connected to the resistor R23; the other end of the resistor R23 is connected to a twenty-eighth of the chip U2; one end of the button K2 is connected to the resistor R22; the other end of the resistor R22 is connected to a tenth pin of the chip U2; one end of the button K3 is connected to the resistor R21; and the other end of the resistor R21 is connected to a ninth pin of the chip U2.

9. The heater according to claim 1, wherein the heater body further comprises a mounting base and a heater housing;

the heating stick is mounted on one side of the mounting base; the heater housing is mounted on one side of the mounting base and is covered at the heating stick;

the two water shortage probes are mounted at a position, located inside the heater housing, on one side of the mounting base; the temperature probe is mounted at a position, located outside the heater housing, on one side of the mounting base; and a plurality of hollow holes are provided in the heater housing.

10. The heater according to claim 9, wherein the mounting base comprises: a mounting base housing and a mounting base rear cover;

an accommodating slot is provided in the other side of the mounting base housing; the heating stick, the two water shortage probes, and the temperature probe extend into the accommodating slot for being fixed after passing through one side of the mounting base rear cover;

the mounting base rear cover is fixed at an opening of the accommodating slot; and a power cable connected to the driving controller is respectively electrically connected to the heating stick, the two water shortage probes, and the temperature probe through the mounting base rear cover.

11. The heater according to claim 9, wherein the heater housing comprises a housing body and a housing plug;

one side of the mounting base housing extends towards the housing body to form a first fixed flange; after the housing body sleeves the first fixed flange, a fixing screw extends into the first fixed flange for fixing through the housing body;

one side of the housing plug extends towards the housing body to form a second fixed flange; and after the housing body sleeves the second fixed flange, a fixing screw extends into the second fixed flange for fixing through the housing body.

* * * * *